United States Patent
Ferrante

(10) Patent No.: US 7,038,617 B1
(45) Date of Patent: May 2, 2006

(54) SENSOR DOPPLER/WAVELET PROCESSING

(75) Inventor: John G. Ferrante, Wilmington, DE (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/138,109

(22) Filed: May 26, 2005

(51) Int. Cl.
*G01S 13/52* (2006.01)

(52) U.S. Cl. ............... 342/160; 342/159; 342/162; 342/195

(58) Field of Classification Search ............ 342/159, 342/160, 162, 195, 196; 367/901
See application file for complete search history.

(56) References Cited

U.S. PATENT DOCUMENTS 5,602,760 A * 2/1997 Chacon et al. ............ 342/159
6,097,669 A * 8/2000 Jordan et al. ............ 367/901

OTHER PUBLICATIONS

Colestock, M. A., "Wavelets- a new tool for signal processing analysts", Proceedings of 1993 IEEE.AIAA 12th Digital Avionics Systems Conference, Forth Worth, TX USA Oct. 25-28, 1993.*

* cited by examiner

*Primary Examiner*—Ian J. Lobo
(74) *Attorney, Agent, or Firm*—Duane Morris LLP

(57) ABSTRACT

A method according to an aspect of the invention is for filtering coherent multipulse radar, sonar or lidar returns. The method comprises the steps of separating the returns into mutually orthogonal I & Q components, performing wavelet processing on the I and Q components to generate an I & Q wavelet filter output. The I & Q wavelet filter outputs are data compressed to remove clutter portions. Data compression may be removal of large-amplitude or earliest wavelet responses. An inverse wavelet filtering function is performed on the compressed wavelet filter outputs, to thereby generate edited coherent I & Q components. Doppler filtering, is performed on the edited coherent I and Q components to thereby generate frequency-domain target data in which the minimum discernible target velocity is improved.

4 Claims, 1 Drawing Sheet

SENSOR DOPPLER/WAVELET PROCESSING

FIELD OF THE INVENTION

This invention relates to sensors such as radar, sonar, and lidar, using a combination of wavelet and Doppler processing to enhance resolution of relatively low-speed targets in the presence of clutter.

BACKGROUND OF THE INVENTION

In radar (or sonar or lidar) processing to identify targets, the radar signals which are transmitted are ideally reflected by the desired target, and returned to the radar system for identification and ranging. One of the problems to which most radar systems are subject is that of clutter. Clutter is caused by undesired targets, such as trees in a land-based system or waves in a maritime system, which undesired targets are relatively near the radar system, or otherwise located so as to generate an undesired radar return signal. Radar system return signals are often said to follow an "inverse fourth-power" law, in that the strength of the return signal becomes smaller in proportion to the fourth power of the range of the target. A concomitant is that nearby clutter will produce target returns which are very much greater than the returns from small or inconspicuous targets at substantial range. Clutter can occur at any range, however, and tends to obscure desired targets at that range.

Schemes have been developed for reducing the effects of clutter. Moving-target indication (MTI) is a system which tends to suppress or cancel those return signals which exhibit the same return signal phase from pulse to pulse, which generally applies to nonmoving targets. Doppler filtering is a scheme in which the returned radar signal is applied to an array of frequency bins, which separate the signals in accordance with how fast the target is moving. The clutter signals tend to be grouped in the lowest-frequency bins, and can be processed independently from those returns showing higher frequencies indicative of greater speed.

Unfortunately, slow-moving targets, such as helicopters, which are near the radar system, may have return signals which are near the locations in which clutter occurs, and may have target velocities which are low or in the same range as that of clutter. Doppler filtering is not fully effective in extracting target information under such conditions.

Improved resolution of slow-moving targets is desired in the presence of clutter.

SUMMARY OF THE INVENTION

A method according to an aspect of the invention is for filtering coherent multipulse radar return signals. The method comprises the steps of separating the return signals into mutually orthogonal I and Q components, performing wavelet processing on the I component to generate an I wavelet filter output, and performing wavelet processing on the Q component to generate a Q wavelet filter output. The I and Q wavelet filter-outputs are data compressed to remove those portions which are most likely to contain clutter, to thereby generate data compressed wavelet filter outputs. An inverse wavelet filtering function is performed on the compressed wavelet filter outputs, to thereby generate edited coherent I and Q components. Doppler filtering, which may be in the form of the discrete Fourier transform or the fast Fourier transform (DFT or FFT), is performed on the edited coherent I and Q components to thereby generate frequency-domain target data in which the minimum discernible target velocity is improved.

In a particular mode of the method of this aspect of the invention, the step of data compressing the I and Q wavelet filter outputs comprises the step of removing those portions of the I and Q wavelet filter outputs which have the largest amplitudes.

In another particular mode, the step of data compressing the I and Q wavelet filter outputs comprises the step of removing those I and Q wavelet filter outputs which occur earliest in the stream of wavelet responses corresponding to the lowest scale or lowest frequency region in the Doppler domain.

DESCRIPTION OF THE INVENTION

Figure 1:
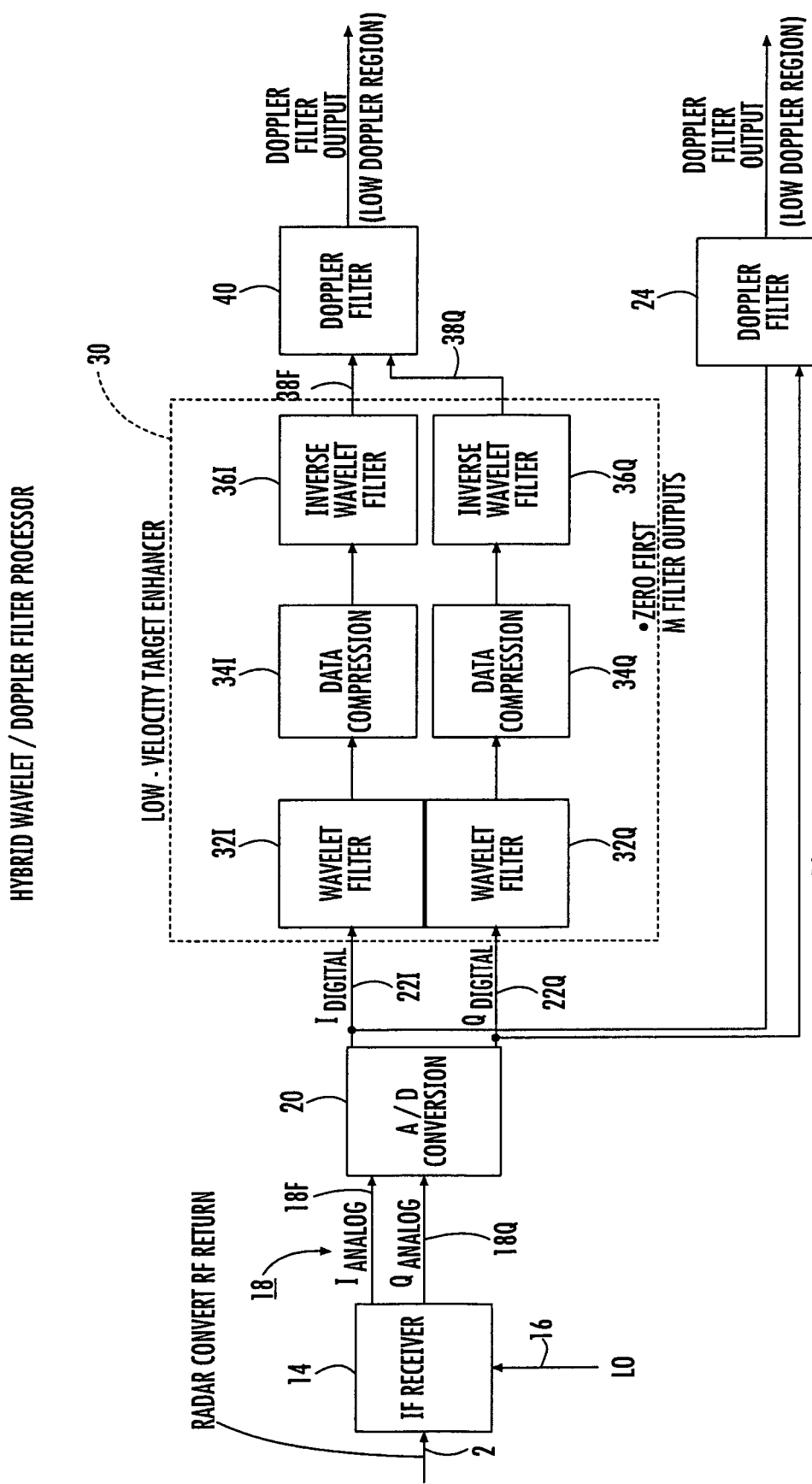
FIG. 1 is a simplified block diagram of a portion of a radar sensor according to an aspect of the invention.

FIG. 1 is a simplified block diagram of a portion of a radar receiver according to an aspect of the invention. In FIG. 1, radar return signals resulting from target reflections due to coherent transmitted pulses appear on an input signals path 12, and are applied to an intermediate-frequency (IF) receiver 14. Receiver 14 also receives local oscillator signals by way of a path 16, and produces analog inphase (I) and quadrature (Q) baseband signals, which are applied by way of individual path portions 18I and 18Q of a path 18 to an analog-to-digital converter (ADC) 20. ADC 20 converts the analog I and Q signals to digital form, and the resulting digital I and Q signals appear on paths 22I and 22Q, respectively.

The digital I and Q signals are applied to a first Doppler filter bank 24, which is a conventional Doppler filter bank for filtering the return signals into various frequency bins. It should be noted that the term "Doppler filter bank" is meant to include all manifestations of such processing, whether accomplished by dedicated hardware or by computation in a processor.

The digital I and Q signals are also applied to a low-velocity target enhancer or target detection enhancer 30. Enhancer 30 includes the cascade of a wavelet filter 32I, a data compressor 34I, and an inverse wavelet filter 36I for the I-channel digital signal returns, and a wavelet filter 32Q, a data compressor 34Q, and an inverse wavelet filter 36Q. Enhanced target I and Q information is produced on output signal paths 38I and 38Q, respectively, and is applied to a second Doppler filter bank 40. Doppler filter bank 40 routes the enhanced signals into frequency bins, as known in the art. A wavelet processor differs from a Doppler processor in that the dimensions are different. The Doppler processor channelizes by time and frequency range, while the wavelet processor channelizes by translation and scale.

According to an aspect of the invention, there is limited or no overlap between the Doppler frequencies of the bins of Doppler filter banks 24 and 40. That is to say that the highest-frequency bins of Doppler filter bank 40 are at frequencies lower, or at least no greater, than the lowest-frequency bins of Doppler filter bank 24.

In operation of system 10 of FIG. 1, the low-velocity target enhancer 30 uses wavelet filtering to translate the returns into different dimensions than frequency and time. More particularly, the dimensions of the wavelet filtering are translation and scale. The properties of wavelet filters are well known, and are described, for example, at http://users.rowan.edu/%7Epolikar/WAVELETS/WTtutorial.html Any filter decomposes the content of input signals into orthonormal components. Conventional Doppler filters decompose signals into their sinusoidal frequency components with the presumption that target information can be extracted from a combined target and interference signal mix by virtue of differences in frequency content. Wavelet processing decomposes signals into scale (not frequency) of wavelet functions, where the wavelet serves as the analog of a sine wave at a particular frequency in Doppler filtering. All wavelet filters apply specific mother wavelet functions tailored to produce beneficial signal decomposition for the particular signal processing problem at hand. The scaling of the mother wavelet function, the contraction or dilation in time of the fundamental wavelet function, is akin to frequency translation in a Doppler filter bank. Whereas Doppler filtering is constrained to fundamental sine wave functions, wavelet filtering can apply a variety of mother wavelet functions to decompose time varying signals.

For radar signals composed of target and interference sources such as clutter, wavelet filtering produces inherently finer separation of signal components than Doppler filters in the lower portion of the Doppler spectrum. The lower portion of the Doppler spectrum is comprised of low velocity targets and clutter. This finer separation or resolution property is exploited in this invention to arrive at enhanced low velocity target extraction from clutter.

The wavelet filtering inherently provides better frequency resolution in the low-frequency domain than a Doppler filter. On the other hand, the resolution at higher frequencies is less than that of a Doppler filter. According to an aspect of the invention, wavelet filtering is performed on the I and Q components, and the resulting wavelet filtered information is data compressed in blocks 34i and 34Q by editing or setting to zero the first M filter outputs, which is to say the first M of N signals to exit the filter, where N represents the total number of processed radar pulses in a pulse sequence. The value of M can be tailored to suit the properties of the clutter. The data compressed I and Q components from blocks 34I and 34Q are applied to inverse wavelet filters 36I and 36Q, which reconvert the data compressed returns to the frequency-time domain.

The output signals from Doppler filters 24 and 40 are at different frequencies. The two banks of Doppler filters may be viewed as being two portions of a single bank of Doppler filters covering the combined frequency range. However, the wavelet processing which precedes the filtering by Doppler filter bank 40 tends to suppress clutter to provide better target resolution than would be obtainable by use of Doppler filters 24 and 40 without the wavelet processing.

The various frequency bins of the Doppler filters 24 and 40 of FIG. 1 may be viewed as being the bins of a single, wideband Doppler filter banks, so the outputs of Doppler filter banks 24 and 40 may be combined, and used for further processing in conventional manner.

Thus, a method according to an aspect of the invention is for filtering coherent multipulse radar return signals. The method comprises the steps of separating (20) the return signals into mutually orthogonal I and Q components, performing wavelet processing (32I) on the I component to generate an I wavelet filter output, and performing wavelet processing (32Q) on the Q component to generate a Q wavelet filter output. The I and Q wavelet filter outputs are data compressed (34i, 34Q) to remove those portions which are most likely to contain clutter, to thereby generate data compressed wavelet filter outputs. An inverse wavelet filtering function (36I, 36Q) is performed on the compressed wavelet filter outputs, to thereby generate edited coherent I and Q components. Doppler filtering (40) (DFT or FFT) is performed on the edited coherent I and Q components to thereby generate frequency-domain target data in which the minimum discernible target velocity is improved.

In a particular mode of the method according to this aspect of the invention, the step of data compressing (34I, 34Q) the I and Q wavelet filter outputs comprises the step of removing those portions of the I and Q wavelet filter outputs which have the largest amplitudes.

In another particular mode of the method according to this aspect of the invention, the step of data compressing (34I, 34Q) the I and Q wavelet filter outputs comprises the step of removing those I and Q wavelet filter outputs which occur earliest in the stream of wavelet responses.

In yet another particular mode of the method, the additional step is performed of Doppler filtering (24) the mutually orthogonal I and Q components into frequency bins having frequencies above the frequencies associated with the minimum discernible target velocity.

What is claimed is:

1. A method for filtering coherent multipulse radar return signals, said method comprising the steps of:
    separating said return signals into mutually orthogonal I and Q components;
    performing wavelet processing on said I component to generate an I wavelet filter output;
    performing wavelet processing on said Q component to generate a Q wavelet filter output;
    data compressing said I and Q wavelet filter outputs to remove those portions which are most likely to contain clutter to thereby generate data compressed wavelet filter outputs;
    performing an inverse wavelet filtering function on the compressed wavelet filter outputs, to thereby generate edited coherent I and Q components;
    Doppler filtering said edited coherent I and Q components to thereby generate frequency-domain target data in which the minimum discernible target velocity is improved.

2. A method according to claim 1, wherein said step of data compressing said I and Q wavelet filter outputs comprises the step of removing those portions of said I and Q wavelet filter outputs which have the largest amplitudes.

3. A method according to claim 1, wherein said step of data compressing said I and Q wavelet filter outputs comprises the step of removing those I and Q wavelet filter outputs which occur earliest in the stream of wavelet responses.

4. A method according to claim 1, further comprising the step of Doppler filtering said mutually orthogonal I and Q components into frequency bins having frequencies above the frequencies associated with said minimum discernible target velocity.

* * * * *